No. 851,406. PATENTED APR. 23, 1907.
A. S. CROCKER.
MANUFACTURE OF SAND LIME OR COMPOSITE BRICK OR STONE.
APPLICATION FILED NOV. 21, 1906.
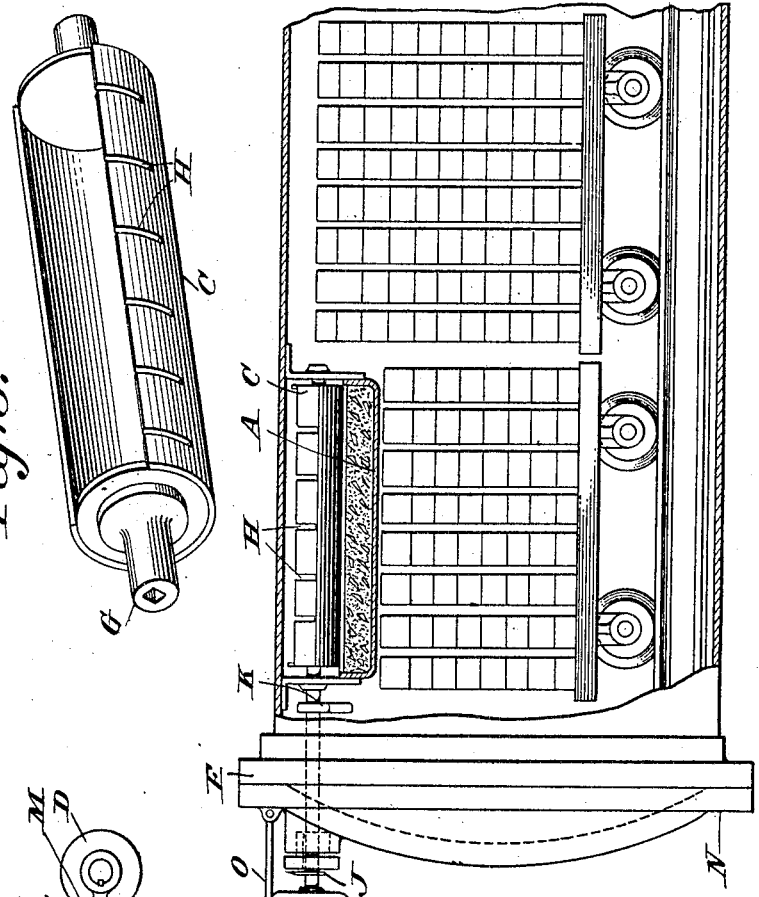
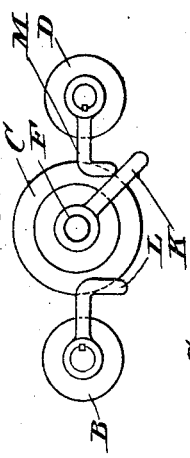
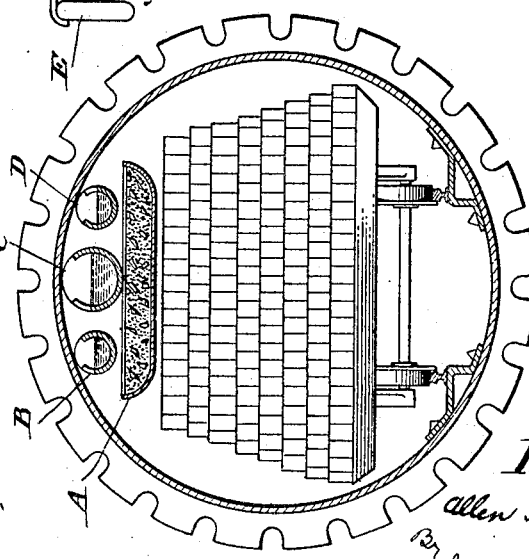
Witnesses:
Inventor:
Allen S. Crocker,
By James Harold Warner,
Attorney.

UNITED STATES PATENT OFFICE.

ALLEN S. CROCKER, OF ROCHESTER, NEW YORK, ASSIGNOR TO LAURENCE ELKUS, OF INDIANAPOLIS, INDIANA.

MANUFACTURE OF SAND LIME OR COMPOSITE BRICK OR STONE.

No. 851,406.          Specification of Letters Patent.          Patented April 23, 1907.

Application filed November 21, 1906. Serial No. 344,392.

*To all whom it may concern:*

Be it known that I, ALLEN S. CROCKER, a citizen of the United States, and a resident of Rochester, in the county of Monroe and State of New York, have invented a certain new and useful Improvement in the Manufacture of Sand Lime or Composite Brick and Stone, of which the following is a specification.

In the manufacture of this material, sand is mixed with hydrated lime, the material moistened and pressed into desired shape. This is then subjected to a steam pressure of 100 to 150 lbs. for a period of eight to ten hours. In some cases the lime is not hydrated before mixing but is ground in the raw state, mixed with the sand, then moistened and allowed to stand and hydrate in presence of sand. The strength of the brick or other form of stone is obtained by the active silica of the sand uniting with the hydrated lime to form a calcium silicate. The lime is always in a pulverized form before adding, *i. e.*, resembling flour. After bricks are taken from the steaming or hardening cylinders, they increase in strength with exposure to the air. This increase is slow, covering an indefinite period, and is caused by the lime which has not united with the sand taking up carbon di-oxide from the air, and changing to the carbonate. Some sands do not contain sufficient active silica to take up all of the lime, and it is always impossible to get all of the lime into sufficiently intimate contact with the sand to form the silicate. I propose to introduce carbon dioxide into the steaming cylinder to cause this hardening to take place at once, and my invention covers the apparatus of generating it in the cylinder.

The apparatus will now be described with reference to the drawings, in which

Figure 1 is one end view of steaming cylinder showing head removed, Fig. 2 is a transverse section and part elevation of the steaming cylinder, Fig. 3 is an isometric view of one of the tanks used for holding hydrochloric acid, Fig. 4 is an end view of the said cylinders, Fig. 5 is an end view of the index used for the purpose of showing the position of these tanks.

Like letters refer to the same parts throughout the description.

A is a lead lined pan, supported as shown from top of cylinder and near end thereof. This is to contain calcium carbonate in any of its commercial forms, as limestone, marble, etc. B, C and D are vessels supported on cylindrical shafts and are used for holding commercial hydrochloric acid of any strength. These are also lead lined to prevent action of acid. It is my intention to fill these vessels to the center with acid and to fill pan A with calcium carbonate. After the bricks are nearly steamed, *i. e.*, if they are to be steamed eight hours, at the end of the seventh hour, by partly turning hand wheel E the shaft F is turned. The shaft F is squared on its end, fits into hub G on vessel C and when turned it revolves C. Acid then spills out of C through slots H and is distributed over the calcium carbonate. Carbon dioxide is thus liberated, and, as it is heavier than steam, tends to sink towards bottom of cylinder. As steam enters the cylinder at this end and the condensation is taken out at the opposite end, the circulation of the steam will drive the carbon dioxide gases through the cylinder, and will thus change unused lime into carbonate of lime, thereby hardening brick. In order that this carbon dioxide may not be liberated too quickly the index J (see Fig. 2 and Fig. 5) is placed on shaft F to tell the degree cylinder C is tipped. When C has been tipped through 90° it contains no more acid. A further turning of E and F brings lever K (which is attached to shaft F) in contact with lever L, which is fastened to shaft carrying vessel B; this spills the acid from B. When C has been turned through 180 degrees all acid has been spilled from B. The wheel E is then turned back to allow K to come in contact with M and thus spill acid out of D. In this way the generation of the gas can be regulated, and the acid is well distributed over the calcium carbonate.

The head N of cylinder has to be removed before bricks are taken out; for this reason shaft F is made to slide forward and be removed after the steam pressure has been let down.

O is a latch or catch which drops over the wheel E and prevents the unbalanced steam pressure on end of rod F from forcing rod out of the cylinder when steam pressure is on.

What I claim as new is,—

1. In a hardening cylinder, a pan adapted and constructed to contain calcium carbonate, means for suspending said pan from the top of said cylinder, a vessel or vessels adapted and constructed to contain hydrochloric acid, means for supporting said vessel or vessels above said pan, a shaft in said cylinder, means for supporting said vessel or vessels on said shaft above said pan, and means for revolving said shaft and said vessel or vessels, substantially as described.

2. In a hardening cylinder, the combination of a pan, means for suspending the said pan from the top of said cylinder, vessels in said cylinder, a shaft in said cylinder, means for supporting said vessels on said shaft above said pan, and means for revolving said shaft and vessels, substantially as described.

3. In a hardening cylinder, the combination of a pan (A), means for suspending said pan from the top of said cylinder, vessels (B), (C) and (D), a shaft (F), means for supporting vessels (B), (C) and (D) on said shaft above said pan and means for revolving said shaft and said vessels (B), (C) and (D).

In witness whereof I have hereunto set my hand this 19th day of November, 1906.

ALLEN S. CROCKER.

In the presence of:
G. WILLARD RICH,
JAMES F. JOHNSON.